Patented Aug. 21, 1951

2,564,735

UNITED STATES PATENT OFFICE 2,564,735

ANTISLIP SURFACE COATING COMPOSITION

Alan J. Stockwell, Detroit, Mich., assignor to Minnesota Mining & Manufacturing Company, St. Paul, Minn., a corporation of Delaware No Drawing. Application October 14, 1944, Serial No. 558,747

6 Claims. (Cl. 260—13)

The present invention relates to the art of producing plastic compositions of material, and more particularly concerns compositions which are highly adherent to metal surfaces, will withstand being walked upon and will provide a wear-resistant, anti-slip surface in the dried or cured condition.

One example of the use of the composition in question is coating areas of the wings or walkways of airplanes to prevent slipping by those who walk thereupon.

Heretofore it has become a common practice to cement strips of sandpaper to the wings of airplanes, or to the decks of battleships, to retard slipping by men, especially when the surfaces are wet or frosty. Such sheeted abrasive coated materials provided the advantage of preventing slippage and provided a substantial step forward over the use of the unprotected or painted wing or deck surfaces, but such materials had a common drawback. For one thing, from the technological point of view, it will be apparent that the paper or cloth present as a backing of the sheeted abrasive article became an unnecessary element in the final airplane or battleship. In the case of the airplane, this matter simply added excess weight, which is undesirable. In the case of both the airplane and the battleship, the cloth, paper or the like also provided a real fire hazard. If a fire broke out, it would spread rapidly as the result of such paper or cloth backing of the abrasive coated sheet material, which was applied over substantial areas of surface.

A purpose of this invention is to further advance this art and to do away with the necessity of having a cloth or paper backing employed, while still getting the result or advantage of an anti-slip surface. I have found that I can produce a composition of matter, which can be shipped and sold in bulk containers, and applied to the desired surface or surface areas, e. g. with a trowel or other implement, or by spraying, and can be smoothed out, and when dried will form an adherent, enduring surface coating which will stand up after being walked upon by many people over a long period of time and will additionally very well meet the desired requirements of a good anti-slip surface.

While I have discovered that variations are possible, one type of composition which will serve for the stated use is the following:

Example A

| | Pounds |
|---|---|
| Polyalkylene polysulfide polymer | 900.0 |
| Calcium stearate | 4.5 |
| Nitrocellulose solution, 30% solids | 1050.0 |
| Red iron oxide | 11.6 |
| Chrome yellow | 16.5 |
| Carbon black | 1.5 |
| Butyl acetate | 580.0 |
| Acetone | 320.0 |
| Ground cork | 136.0 |

The polyalkylene polysulfide polymer e. g., a polyethylene polysulfide polymer may conveniently be obtained in the form of a coarse dispersion in water, and which analyzes approximately 50% solids as received. Such a product may be, for example, "Thiokol Latex WD-2," a 50% solids content water dispersion of a soft, relatively odorless polyalkylene polysulfide resin.

The nitrocellulose solution is prepared by dissolving half-second nitrocellulose, which is obtained from the manufacturer as loose shreds wet with about 35% of denatured ethyl alcohol, in butyl acetate sufficient to produce a solution containing 30% by weight of dry nitrocellulose.

The polyalkylene polysulfide latex is allowed to stand without agitation until considerable settling occurs, whereupon sufficient of the supernatant aqueous liquid is decanted to bring the concentration of the remaining portion (after stirring) to 60% solids. A sufficient quantity of this 60% latex to yield the required 900 lbs. of solid polyalkylene polysulfide is transferred to a mixer, conveniently of the Werner-Pfleiderer type; the calcium stearate is then added and mixed in thoroughly. Approximately one-half of the nitrocellulose solution is next added and mixing continued until a separation of water occurs. As soon as such separation is largely effected, the water is decanted. The pigments, which serve to provide a desirable color, and may in addition impart other desirable qualities to the composition, are next added and mixed in well. The balance of the nitrocellulose solution (which includes butyl acetate as well as ethyl alcohol), together with about 440 lbs. of the mixed solvent previously prepared by mixing the butyl acetate and acetone, is then mixed in. The butyl acetate, in this product, has in effect replaced the water of the "Thiokol Latex WD-2," providing a stable dispersion of the polyalkylene polysulfide resin in the butyl acetate. To this solvent-dispersion composition is then added the ground or otherwise finely divided cork. The well-mixed product is then further diluted with the remainder of the mixed solvent, to provide a plastic composition which may be stored and shipped in bulk containers such as metal drums. The composition may be readily applied, as by troweling and/or spraying, etc., in any desired thickness to metal or other surfaces, whether flat or curved; on evaporation of solvent from such troweled layers, there is provided on the metal and other surface an adherent, tough, enduring, anti-skid coating.

Shredded cork is added in order to provide a roughened surface on the final dried coating; the cork is light in weight, soft and non-abrasive to metal surfaces, and is not broken or disintegrated by moderate pressures. The particle size is so selected as to provide a well roughened surface without danger of shearing of the particles and consequent exposure of the interior of such particles when the coated surface is walked upon.

A further modified composition which may be used for the same purpose as the above, is the following:

*Example B*

| | Pounds |
|---|---|
| Polyalkylene polysulfide polymer | 900.0 |
| Calcium stearate | 4.5 |
| Nitrocellulose solution (30% solids) | 840.0 |
| Red iron oxide | 11.6 |
| Chrome yellow | 16.5 |
| Carbon black ("Gastex") | 1.5 |
| Shredded cork, as in Example A | 136.0 |
| Butyl acetate | 710.0 |

In this example, I may use the dispersion of soft polyalkylene polysulfide resin (which can be converted from a water-dispersion to a stable butyl acetate dispersion, as indicated above, following Example A) known, at the date of filing of this application, as "Thiokol Latex MX-3112." The latex is first concentrated, by settling and decanting, from 50% to 60% solids, as in Example A; and the procedure therein set forth for addition of nitrocellulose solution, removal of water, addition of pigments, addition of further nitrocellulose and solvent (which in the present example is butyl acetate), addition of the shredded cork, and final dilution to desired viscosity is carried out to produce an effective antiskid coating material.

Insofar as I am aware there is no prior published disclosure of how to make an effective adhesive with a polyalkylene polysulfide polymer resin such as the products known on the market as "Thiokol." A pending application, now under a secrecy order, assigned to the assignee of the present application, provides a disclosure of the production of an adhesive from a polyalkylene polysulfide resin but does not, insofar as I am aware, provide the disclosure of a composition such as those above illustrated, nor does it provide a composition which would be useful, in the form disclosed therein, for the purposes hereinabove set forth, e. g. as a "wing walk" coating for airplanes or a "deck tread" coating for battleships, cruisers, etc.

It will be apparent that the above examples are merely illustrative of my invention. However, it is equally to be understood that in the case of many plastic compositions, if ground cork were simply added thereto, and the composite applied to wings of airplanes or the like the result would be very unsatisfactory as a wing walk in that the adherence to the surface would be very poor and/or the cork particles would fall out of the dried film and/or the wear-resistance or the ability to supply an anti-slip surface would be poor with many of such compositions. If the cork or like particles would fall out of the surface, the slipping hazard would be worse instead of better. Accordingly it will be understood that for a composition of this kind to be successful and genuinely useful, in a practical sense, it is necessary to have a composition where, in the form of the final dried film, the cork or like particles will remain tenaciously bonded for long periods of time and provide a good wearing surface.

The examples above set forth describe two compositions in which two types of soft, water dispersion polymerized polyalkylene polysulfide synthetic rubbery materials are used. Other polyalkylene polysulfides, or other rubbery materials, may in certain instances be substituted for these specific varieties, as long as such substitute materials possess the required properties of compatibility, adhesion, toughness, resistance to water and oils, and the like. In this connection however, it is to be noted that many polymers are deficient in one or more of these qualities, and particularly in adhesion and in compatibility characteristics. Indeed, in view of the general character of polyalkylene polysulfide polymers, it is surprising that they produce such adherent and generally advantageous coatings as are obtained with the novel compositions of my invention. Since many of the available polymers which are useful for such purposes are initially prepared and commercially available in the form of aqueous dispersions, it is highly advantageous to use the methods described (e. g. in Example A above) in producing the final solvent-dispersion composition.

In producing my novel composition as described under Example A, I have found that the presence of minor proportions of water, presumably remaining in the composition due to incomplete decantation, may cause swelling of the cork particles and consequent weakening of the final dried coating. This condition I have effectively prevented by the substitution of acetone, a water-soluble organic solvent, for a portion of the water-insoluble butyl acetate. However, such substitution may be unnecessary under certain conditions, as shown by Example B.

The nitrocellulose, which in the Examples represents approximately 28 to 35%, e. g., about 30%, by weight of the weight of the polyalkylene polysulfide, is preferably a low-viscosity type having a nitrogen content of from about 11.2 to about 12.3 percent, with corresponding easy solubility in such solvents as butyl acetate and the like. The amount and type of nitrocellulose used may vary from the above values, depending on the surfaces to which the composition must later be adhered, the type of solvent or solvents to be employed, the firmness of the rubbery polymer, and/or on other factors.

The nitrocellulose, or some equivalent material, appears to be necessary for the successful replacement of water in forming a solvent-dispersion composition from an aqueous dispersion of the rubbery polymer, and it also aids in providing effective adhesion both to the cork or similar particles and to the surface to which the composition is applied. Certain suitable materials other than nitrocellulose may be used as substitutes therefor; e. g. ethylcellulose, polyvinyl butyral, polyvinyl acetate-chloride copolymers, and various equivalent materials may be used to replace nitrocellulose either in whole or in part. These materials, as commonly known, are, like nitrocellulose, also soluble in butyl acetate and acetone. However, the low comparative cost and relative availability of nitrocellulose, as well as its somewhat better adhesion and solubility characteristics, ordinarily indicate its preferred use.

Calcium stearate apparently serves to stabilize the polyalkylene polysulfide polymer. The inorganic pigments and carbon black, in addition to providing color, may also toughen or otherwise desirably modify the composition. Substitute materials having similar desirable properties may be used in place of these specific ingredients, which are not included in the examples in any sense of restriction but rather as specific representatives of quite broad classes. Likewise, where butyl acetate and acetone have been listed as solvents, it will be obvious to employ in place of these specific ingredients, other organic liquids which are capable of satisfactorily dispersing or dissolving the polyalkylene polysulfide resin or equivalent and the nitrocellulose or equivalent, and which are sufficiently volatile to permit drying of the plastic composition under normally desirable conditions of use.

As previously indicated, cork is a desirable roughening agent in my novel anti-slip composition because of its light weight and other properties.

In place of cork, ground chips of resin, such as the heat-advancing type of phenolic resinoids or phenol aldehyde plastics, insoluble in the solvent employed, or other such materials may be employed, and some of such filler materials show promise of being even more enduring than cork for the purposes in question.

What I claim is:

1. A non-skid plastic trowel-on coating composition suitable for application to metal walkways of airplanes and capable of forming, when applied to said walkways and dried thereon, a firm, tough, wear-resistant, oil-resistant, firmly adherent and enduring anti-slip surface, said coating composition comprising a uniform mixture of a minor proportion of insoluble, finely divided, granular anti-slip material in a dispersion of a soft rubbery polyalkylene polysulfide polymer in a solution in a volatile organic solvent of a butyl acetate soluble nitrocellulose, said nitrocellulose being present in an amount substantially less than that of said rubbery polymer but sufficient substantially to improve the firmness and adherence of the composite coating, and being present in an amount equal to about one-third the amount of said rubbery polymer.

2. A non-skid plastic trowel-on coating composition suitable for application to metal walkways of airplanes and capable of forming, when applied to said walkways and dried thereon, a firm, tough, wear-resistant, oil-resistant, firmly adherent and enduring anti-slip surface, said coating composition comprising a uniform mixture of a minor proportion of finely divided cork disseminated in a dispersion of a soft rubbery polyalkylene polysulfide polymer in a solution in a volatile organic solvent of a butyl acetate soluble nitrocellulose, said nitrocellulose being present in an amount equal to about one-third the amount of said rubbery polymer.

3. A non-skid plastic trowel-on coating composition suitable for application to metal walkways of airplanes and capable of forming, when applied to said walkways and dried thereon, a firm, tough, wear-resistant, oil-resistant, firmly adherent and enduring anti-slip surface, said coating composition comprising a mixture of about 15 parts of shredded cork uniformly disseminated in a dispersion of about 100 parts of a soft rubbery polyethylene polysulfide polymer in a solution in a volatile organic solvent of about 30 parts of butyl acetate soluble nitrocellulose, said solvent being in an amount just sufficient to provide spreadability of said coating composition.

4. The composition of claim 3 in which the volatile organic solvent comprises butyl acetate and a water-soluble volatile organic solvent.

5. A structure comprising a walkway having a surface, and, self-adherently firmly bonded thereto, a firm, tough, oil- and water-resistant, wear-resistant and enduring anti-slip surface coating, said coating being the in situ dried residue of a plastic trowel-on coating composition and comprising particles of finely divided cork uniformly disseminated and firmly adherently held in a binder comprising 100 parts of soft rubbery polyethylene polysulfide polymer, about 30 parts of butyl acetate soluble nitrocellulose, and a chrome pigment, the amount of cork particles being sufficient to provide a well roughened surface on the dried coating.

6. A non-skid trowel-on coating composition suitable for application to metal walkways of airplanes and capable of forming, when applied to said walkways and dried thereon, a firm, tough, wear-resistant, firmly adherent and enduring anti-slip surface, said coating composition consisting essentially, in parts by weight, of 100 parts of soft, butyl acetate insoluble, rubbery polyethylene polysulfide polymer, 30 parts of low viscosity, butyl acetate-soluble nitrocellulose, 15 parts of ground cork, and a quantity of butyl acetate just sufficient to provide spreadability of said coating composition.

ALAN J. STOCKWELL.

REFERENCES CITED

The following references are of record in the file of this patent:

UNITED STATES PATENTS

| Number | Name | Date |
|---|---|---|
| 1,854,480 | Mnookin | Apr. 19, 1932 |
| 2,100,351 | Patrick | Nov. 30, 1937 |
| 2,158,469 | McManus | May 16, 1939 |
| 2,219,550 | Martin | Oct. 29, 1940 |
| 2,279,450 | Diehl | Apr. 14, 1942 |
| 2,342,582 | Hooker | Feb. 22, 1944 |
| 2,400,054 | Robinson | May 7, 1946 |
| 2,400,474 | Ten Broeck | May 14, 1946 |

FOREIGN PATENTS

| Number | Country | Date |
|---|---|---|
| 25,726 of 1908 | Great Britain | July 29, 1909 |
| 568,914 | Great Britain | Apr. 26, 1945 |

OTHER REFERENCES

Morrell, Synthetic Resins, page 9, Oxford University Press (1943), second edition.

Hercules Ethyl Cellulose (1944 edition), page 17.